H. H. WILLIAMS & F. F. WEAVER.
WEED CUTTER.
APPLICATION FILED FEB. 16, 1916.
1,186,355.
Patented June 6, 1916.
2 SHEETS—SHEET 1.
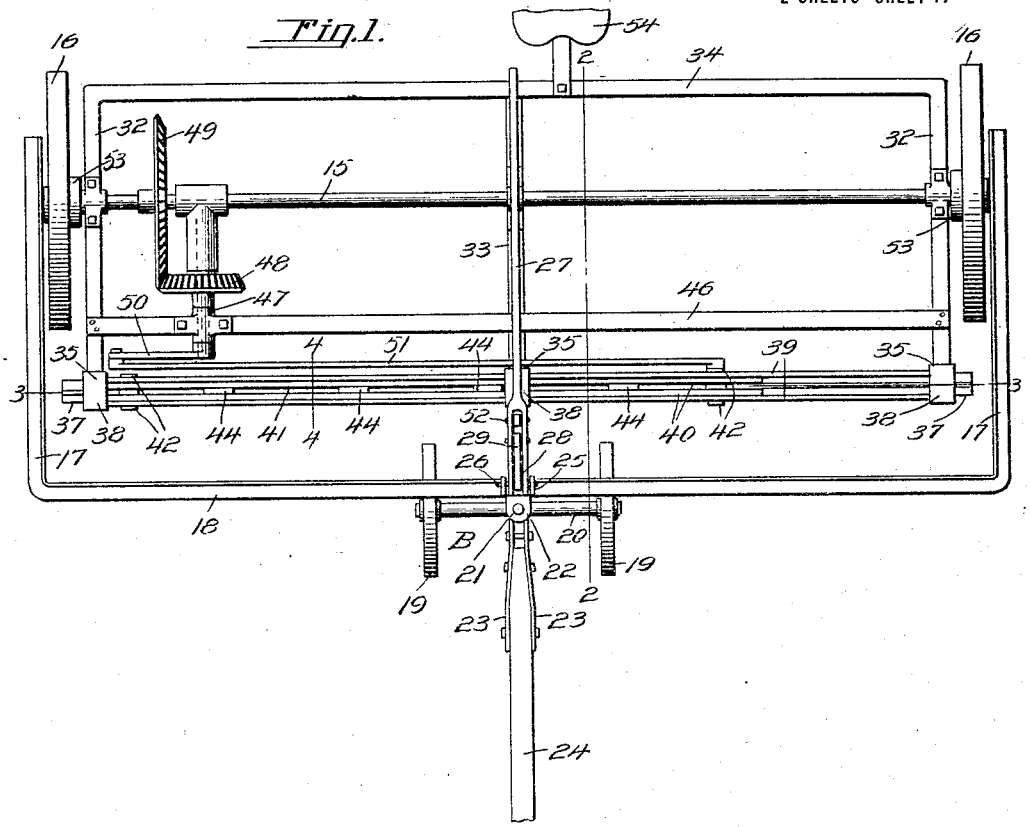
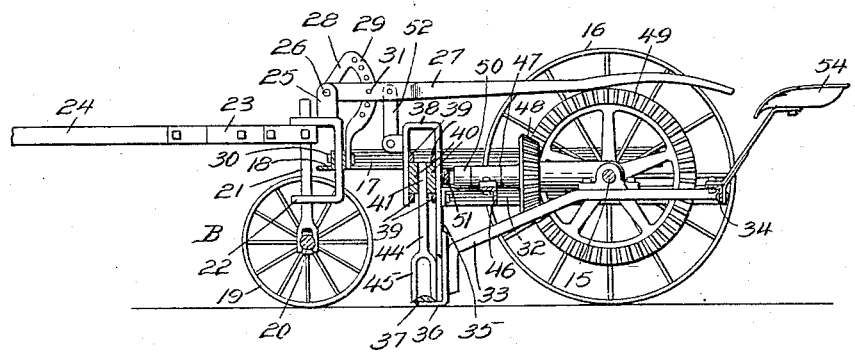
Inventors
Harry H. Williams
Fred F. Weaver.
Witnesses
By Victor J. Evans
Attorney

H. H. WILLIAMS & F. F. WEAVER.
WEED CUTTER.
APPLICATION FILED FEB. 16, 1916.

1,186,355.

Patented June 6, 1916.
2 SHEETS—SHEET 2.

Inventor
Harry H. Williams.
Fred F. Weaver.

Witnesses

By Victor J. Evans
Attorney

UNITED STATES PATENT OFFICE.

HARRY H. WILLIAMS AND FRED FREDRICH WEAVER, OF CHENEY, WASHINGTON.

WEED-CUTTER.

1,186,355.　　　　Specification of Letters Patent.　　Patented June 6, 1916.

Application filed February 16, 1916. Serial No. 78,761.

*To all whom it may concern:*

Be it known that we, HARRY HARRISON WILLIAMS and FRED FREDRICH WEAVER, citizens of the United States, residing at Cheney, in the county of Spokane and State of Washington, have invented new and useful Improvements in Weed-Cutters, of which the following is a specification.

This invention relates to weed cutters, and it has particular reference to weed cutters of that class in which a horizontally disposed knife or cutter is mounted in a horizontal position with respect to a portable frame structure, said cutter being disposed to skim the surface of the ground for the purpose of cutting the roots of weeds and the like.

The present invention has for its object to produce a machine of the type above described of simple and improved construction and which will enable the cutting blade to be conveniently moved to and from an earth engaging position and also enabling the said cutting member to be so supported as to cut any desired distance below the surface of the soil.

A further object of the invention is to produce a device of the class described which will be equipped with movably supported cleaning members whereby the cutting member will be constantly kept clean and free from adhering rubbish while the machine is in operation.

A further object of the invention is to simplify and improve the construction and operation of the aforesaid cleaning members.

With these and other ends in view which will readily appear as the nature of the invention is better understood the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 3:
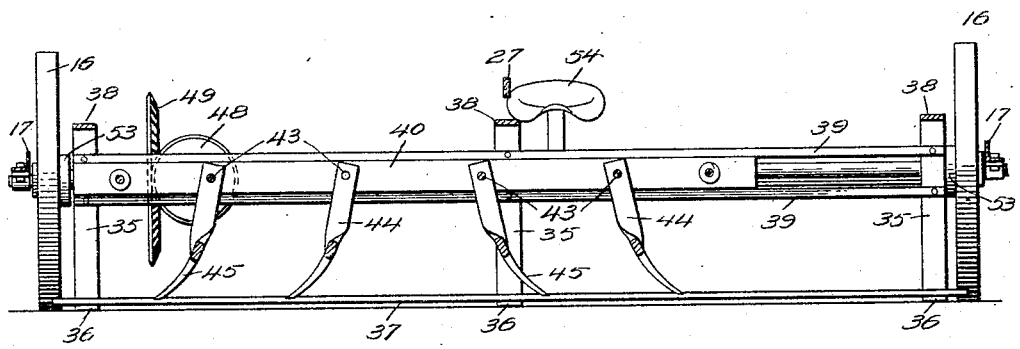
Figure 4:
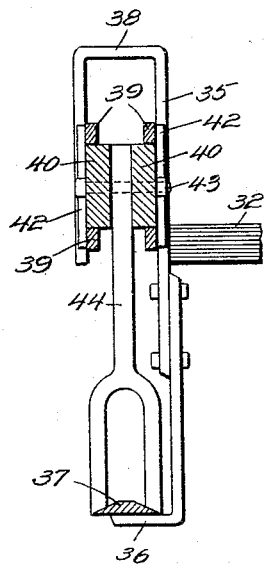

In the drawings, Figure 1 is a top plan view of a machine constructed in accordance with the invention. Fig. 2 is a longitudinal vertical sectional view taken on the line 2—2 in Fig. 1. Fig. 3 is a transverse sectional view taken on the line 3—3 in Fig. 1. Fig. 4 is a transverse sectional view, enlarged, taken on the line 4—4 in Fig. 1.

Corresponding parts in the several figures are denoted by like characters of reference.

The axle 15 having the ground wheels 16 is supported for rotation in the side members 17 of the main frame, said side members being connected at their forward ends by a front bar 18 which is supported on a pony truck B, said pony truck embodying a pair of wheels 19 mounted on an axle 20 which is pivotally connected with a stem 21 guided through the limbs of a yoke 22 mounted on the cross bar 18. The stem 21 is provided with arms 23 with which a tongue, a portion of which is shown at 24, is connected.

The topmost limb of the yoke 22 supports a vertically disposed yoke 25, the limbs of which are connected by a bolt 26 on which a hand lever 27 is fulcrumed. The bolt 26 is connected by a brace 28 with one end of a segment bar 29, the other end of which is secured to the frame bar 18, preferably by means of a bolt or fastening member 30, that serves to connect the yoke 22 with said frame bar. The lever 27 may be adjustably connected with the segment bar 29 in any convenient well known manner, for instance, by means of a bolt 31 for the purpose of securing the parts in adjusted position. An auxiliary frame is provided, said frame including side bars 32 and a center bar 33 which are pivotally mounted on the axle 15, said side bars and center bars being connected to the rearward of the axle by a cross bar 34. The side bars 32 and center bar 33 are each provided at their forward ends with vertically disposed limbs 35, the lower ends of which, 36, have forwardly extending feet on which the blade or cutter 37 is mounted. The limbs 35 are provided at their upper ends with inverted yokes 38 serving to support longitudinal corner bars 39, four in number, which are arranged in spaced relation longitudinally and transversely so as to accommodate between them a slide 40 which operates between the upper and lower corner bars, said slide being provided with a longitudinal slot 41 extending through its entire length. Guide members 42 are secured on the front and rear faces of the slide to engage the exposed faces of the corner bars and serving to retain the slide in position for reciprocatory movement. Pivotally supported on bolts or pivot members 43 extending transversely through the slide and bridging the slot 41 are cleaning members 44, the lower ends of which are provided with forks 45 engaging the cutting blade 37 adjacent to the front and rear edges of the blade. Some of these cleaning members extend to the right, and others to the left, so that when the reciprocatory slide is in motion, some of said cleaning members will exert a scraping and cleaning action with respect to the blade, while others will slide unobstructedly over the blade with a retracting movement, it being obvious that when the slide is in motion the cleaning members will be alternately active and inactive, according to whether they are being advanced or retracted.

The side bars 32 of the auxiliary frame support a cross bar 46 on which is mounted a counter shaft 47 carrying a bevel gear 48 that meshes with a bevel gear 49 on the axle 15 of the machine. The counter shaft 47 is also equipped with a crank 50 that is connected by a pitman 51 with the slide 40 to which reciprocatory motion will thus be imparted when the machine is in operation.

One of the inverted yokes 38 is connected by a link 52 with the lever 27, the latter being fulcrumed on and supported by the said link, so that by actuating the lever the forward end of the auxiliary frame carrying the cutting member, the slide and the cleaning members may be vertically adjusted, it being understood that previous to such adjustment the lever must be disconnected from the segment bar 29, and that after the desired adjustment has been effected, the lever is to be again connected with said segment bar. It is obvious that instead of using a bolt or pin for connecting the lever with the segment bar, the well known form of a rack segment and a stop member coöperating therewith may be adopted.

The ground wheels are to be mounted on the axle by means including clutch members or pawl and ratchet devices of well known construction, as illustrated at 53, in order that the axle may be rotated when the machine is moving in a forward direction and that it may remain stationary when the machine is being moved rearwardly.

A seat for the driver or operator is to be mounted, as shown at 54, on the rear cross bar 34 of the auxiliary frame, thus enabling the weight of the driver to be utilized in counterbalancing the relatively heavy forward portion of said auxiliary frame when the latter is adjusted.

From the foregoing description, taken in connection with the drawings hereto annexed, the operation and advantages of this invention will be readily understood. It will be seen that for transporting the machine from place to place the cutting and cleaning device may be elevated a suitable distance by manipulating the lever 27, the forward part of the auxiliary frame being thereby adjusted with respect to the pony truck. When, by manipulating the lever 27, the forward part of the auxiliary frame carrying the cutting apparatus is lowered, it may be adjusted to cut just above or below the surface of the ground, as may be desired, the knife or cutter being kept constantly free from entangling weeds and roots by the action of the reciprocatory cleaners.

The improved machine is extremely simple in its construction and not liable to get out of order. It is obvious that the machine may be made of any desired width so as to cut as large a swath as may be desired, and that the proportions of the driving parts may be varied to suit the proportions of the machine.

Having thus described the invention, what is claimed as new, is:—

1. In a machine of the class described, a wheel supported main frame having a revolving axle, an auxiliary frame pivotally engaging the axle, a ground engaging cutter carried by the auxiliary frame, a reciprocatory slide having pivoted cleaners engaging the cutter, and means for transmitting motion from the revolving axle to the slide.

2. In a machine of the class described, a revolving axle having ground wheels, a main frame having side members supported on the axle and a front cross bar, a pony truck supporting the front cross bar, an auxiliary frame having side members pivoted on the axle, a ground engaging cutter carried by the auxiliary frame, a reciprocatory slide also carried by the auxiliary frame and having pivoted cleaner members engaging the cutter, a hand lever fulcrumed on the pony truck, a link connecting said hand lever with the auxiliary frame, means for securing the lever in adjusted position, and means for transmitting motion from the revolving axle to the reciprocatory slide.

3. In a machine of the class described, a main frame having side members and front and rear cross bars, a revolving axle supporting the side members of the main frame, a pony truck supporting the front cross bar of said main frame, an auxiliary frame having members pivoted on the axle, said members being provided at their forward ends with upright limbs having forwardly extending feet at their lower ends and inverted yokes at their upper ends, a cutter supported on the forwardly extending feet, corner bars carried by said yokes, a longitudinally slotted slide supported between the corner bars for reciprocatory movement, cleaning members pivoted in the slot of the slide diverging downwardly from the same in opposite directions and having bifurcated ends engaging the cutter, means for adjusting the cutter carrying frame relative to the main frame and the pony truck, and means for driving the reciprocatory slide.

4. In a machine of the class described and including a main frame and a revolving wheel carrying axle, an auxiliary frame having members pivoted on the said axle, said members being provided at their front ends with upright limbs having forwardly extending feet at their lower ends and inverted yokes at their upper ends, a cutter supported on the forwardly extending feet, corner bars supported by said yokes, a longitudinally slotted slide fitted for reciprocation between the corner bars, guides secured on opposite faces of the slide and engaging the exposed faces of the corner bars, pivotally supported cleaning members carried by the slide and having bifurcated ends loosely engaging the cutter, and means for driving the slide from the revolving axle.

5. In a machine of the class described, a main frame, a revolving axle having ground engaging wheels, a yoke supported by the forward portion of the main frame, a pony truck including a wheel carrying axle and a stem pivotally connected with said axle and guided through the limbs of the yoke, a second yoke supported on the uppermost limb of the first yoke, a pivot member connecting the limbs of the second yoke, a lever fulcrumed on the pivot member, means for securing said lever in adjusted position, an auxiliary frame having members pivoted on the axle, a link connecting the lever with the auxiliary frame to effect adjustment of the latter, a cutting member and a reciprocatory slide carried by the auxiliary frame.

In testimony whereof we affix our signatures in presence of two witnesses.

HARRY H. WILLIAMS.
FRED FREDRICH WEAVER.

Witnesses:
ALBERT WILTON,
R. H. MACARTNEY.

Copies of this patent may be obtained for five cents each, by addressing the "Commissioner of Patents, Washington, D. C."